United States Patent [19]

Muta

[11] Patent Number: 4,718,293

[45] Date of Patent: Jan. 12, 1988

[54] SLIDE CYLINDER DEVICE

[75] Inventor: Eizo Muta, Yawata, Japan

[73] Assignee: Kabushiki Kaisha Yushin Seiki, Kyoto, Japan

[21] Appl. No.: 870,191

[22] Filed: Jun. 3, 1986

[30] Foreign Application Priority Data

Apr. 24, 1986 [JP] Japan ............................. 61-62070[U]

[51] Int. Cl.⁴ ............................................. F16H 21/44
[52] U.S. Cl. ........................................ 74/110; 254/360
[58] Field of Search ................... 74/110; 254/385, 386, 254/359, 360, 367

[56] References Cited

U.S. PATENT DOCUMENTS 3,949,620  4/1976  Zehnder ................................ 74/110
4,235,421 11/1980  Phillips ............................. 74/110 X
4,606,587  8/1986  Thompson ........................ 74/110 X Primary Examiner—George H. Krizmanich
Attorney, Agent, or Firm—Armstrong, Nikaido, Marmelstein & Kubovcik

[57] ABSTRACT

The present invention provides a slide cylinder device having a frame with enhanced torsional rigidity and which can have an additional member interposed between the cylinder and the moving board without interfering with the moving board operation. The slide cylinder includes fixed pulleys, whose peripheries are partially exposed from an upper wall of the frame and movable pulleys. A flexible member is connected between the moving board, one of the movable pulleys, one of the fixed pulleys and a wall of the frame.

3 Claims, 7 Drawing Figures

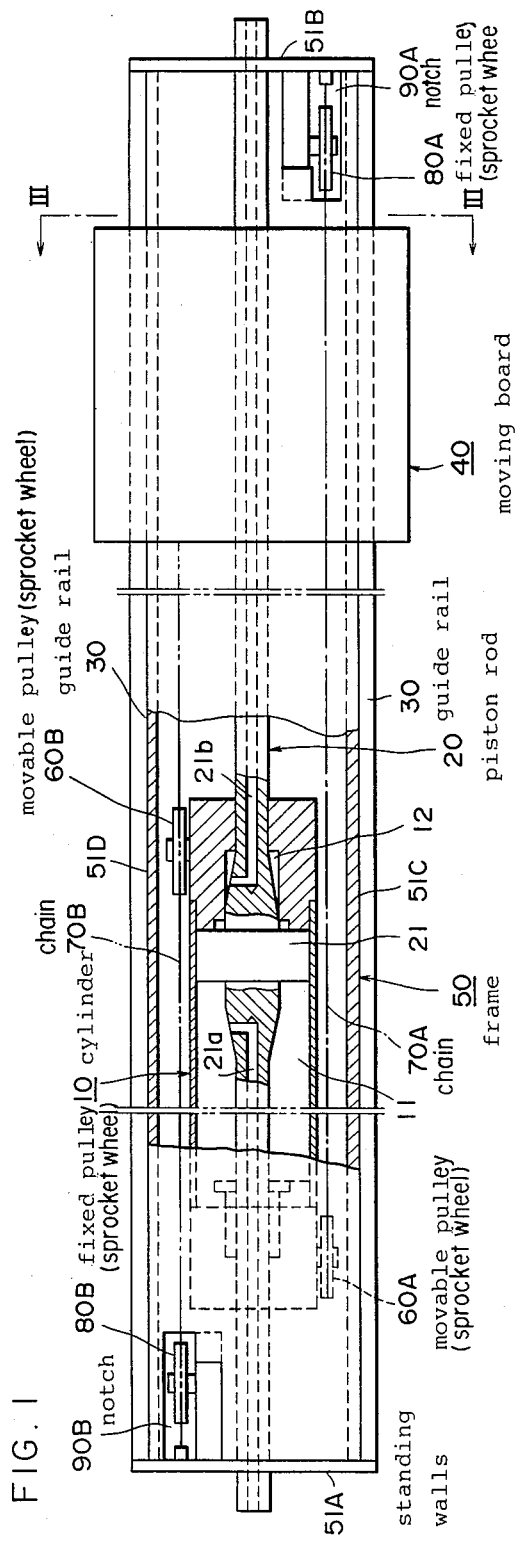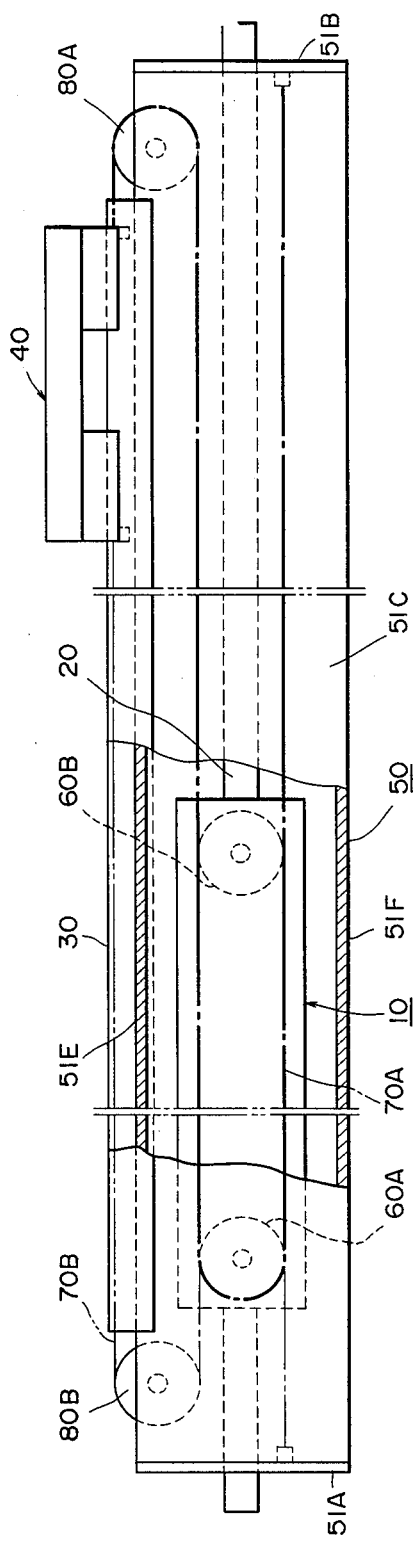
FIG. 1
FIG. 2

SLIDE CYLINDER DEVICE

BACKGROUND OF INVENTION

1. Field of the Invention

The present invention relates to a slide cylinder device which reciprocatively moves a moving board in accordance with reciprocatory movement of a cylinder, the moving board being loaded with a goods catch and take-off carrying means like robots hands.

2. Description of the Prior Art

As shown in FIGS. 5, 6, there has heretofore been well known a slide cylinder device in which a cylinder 100 is so provided as to be reciprocatively movable along a piston rod 101 passing through the cylinder 100 and extending therefrom. A moving board 103 is so provided as to be reciprocatively movable. The moving board 103 is guided by guide rails 102 disposed in parallel with the piston rod 101. There is formed a frame 104 including standing walls 104a, 104b which supportingly fix the respective ends of the piston rod 101 as well as the guide rails 102, the standing walls 104a, 104b being provided at both ends in the longitudinal direction thereof. Movement end portions of flexible linkage members 105A, 105B are linked to the moving board 103 and proximal ends thereof are linked to the front and rear standing walls 104a, 104b of the frame 104. The flexible linkage members 105A, 105B are spanned between a pair of movable pulleys 106A, 106B secured to the cylinder 100.

The slide cylinder device of this type is constituted such that a fluid (for instance, air) is sent alternately from passages 101a, 101b formed in the piston rod 101 into the cylinder 100 thereby to reciprocatively move the cylinder 100 with the guide of the piston rod 101. This movement is conveyed via the flexible linkage members 105A, 105B to the moving board 103 in order that the moving board 103 makes a reciprocatory movement that is twice as long as the movement of the above-described cylinder 100 in the same direction thereof while being guided by the guide rails 102.

In the conventional slide cylinder device, the flexible linkage members 105A, 105B are stretched between only the movable pulleys secured to the cylinder 100. This configuration, however, creates the following disadvantages. If a member (such as robot-hands) is interposed between the cylinder 100 and the moving board 103, this member interferes with the moving board 103 and the flexible linkage members 105A, 105B when the cylinder 100 and the moving board 103 are operated, thereby bringing about an incapability in terms of operation.

For this reason, a cross-sectional configuration of the frame 104 itself inevitably becomes a substantially U-shape whose opening is formed on the side of the moving board 103 as shown in FIG. 7. Such a cross-sectional configuration, however, involves a defect wherein the frame, 104 is low in rigidity. A large decrease in torsional rigidity occurs especially with the long-sized frame which allows a large amount of stroke with respect to the cylinder 100 and the moving board 103.

The torsional rigidity of the frame 104 is lowered, and the torsion is created in the frame 104 at the time of operation, which leads to a disadvantage such that it becomes unfeasible to reciprocatively move the moving board 103 even if the cylinder makes a reciprocatory movement due to a deteriorated condition of the flexible linkage members 105A, 105B spanning the movable pulleys 106A, 106B.

Hence, it is required to enhancing the torsional rigidity of the frame 104 by reinforcing the frame, and inevitably the frame 104 becomes intricate. Furthermore, this causes an increase in amount of processing. On the other hand, dust entering the inside portion from the upward opening adheres to the piston rod 101 and infiltrates into a sealing portion 100a. This produces problems in which the sealing portion 100a is worn off in a relatively short time thereby to degrade sealing properties of the cylinder 100.

SUMMARY OF THE INVENTION

Accordingly, it is a primary object of the present invention which obviates the above-described problems incident to the prior art to provide a slide cylinder device with a simple constitution which is capable of enhancing torsional rigidity of a frame and reducing an amount of dust adhered to a piston rod.

To accomplish this object, the slide cylinder device according to the present invention is constituted such that a frame is tunnelled but closed in section. Notches are so formed as to deviate on both sides in the longitudinal direction as well as on both sides in widthwise direction of peripheral walls thereof. At least a couple of fixed pulley are provided so that leastwise some portions of the peripheries thereof are exposed from the notches. Respective moving end portions of at least two flexible linkage members are linked to a moving board provided on the outer portion of the frame and the proximal end portions thereof are respectively connected to the aforementioned frame. The above-described flexible linkage members span to at least a pair of movable pulleys attached to the fixed pulleys and a cylinder.

BRIEF DESCRIPTION OF THE DRAWINGS

FIG. 1 is a diagramatic plan view, with portions broken away for clarity, which shows one embodiment according to the present invention;

FIG. 2 is a side view of the embodiment shown in FIG. 1;

DESCRIPTION OF THE PREFERRED EMBODIMENTS

Figure 3:
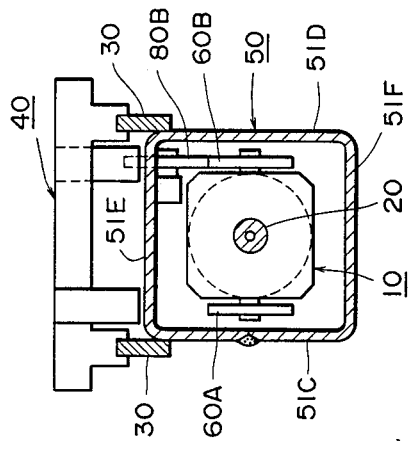
FIG. 3 is a sectional view taken substantially along the line III—III of FIG. 1.

FIG. 1 is a diagramatic plan view which shows one embodiment in section according to the present invention, FIG. 2 is a side view thereof and FIG. 3 is a sectional view taken along the line II—II of FIG. 1. In the Figures, the reference numeral 10 represents a cylinder, the numeral 20 stands for a piston rod, 30 denotes a pair of guide rails, 40 designates a moving board, 50 denotes a frame, 60A and 60B stand for a couple of movable pulleys, 70A and 70B are two flexible linkage members, and 80A, 80B represent a couple of fixed pulleys.

A piston 21 provided at the central portion of the piston rod 20 is fitted in the cylinder 10. The inside of the cylinder 10 is divided into a front chamber 11 (the left in the Figure) and a rear chamber 12 (the right in the Figure), which cylinder 10 is so provided as to freely make reciprocatory movement with the guide of the piston rod 20.

Lengthwise end portions of the piston rod 20 are supportingly fixed to each of standing walls 51A, 51B which are lengthwise provided at both ends of the frame 50. The piston rod 20 includes a front passage 21a formed in the front chamber 11 of the cylinder 10 along the axis thereof and a rear passage 21b formed in the rear chamber 12 thereof. It can be observed through FIG. 1 that a pressure fluid (for example, air with high pressure) is supplied via the front passage 21a to the front chamber 11 of the cylinder 10 which is positioned at the stroke front end.

A pair of the guide rails 30 have an axis parallel to that of the piston rod 20. These guide rails 30 are so mounted as to be spaced widthwise therebetween on the upper external surfaces of walls 51C, 51D provided at both side portions of the frame 50.

The moving board 40 straddles the guide rails 30 on the upper side of the frame 50 so that the same board 40 is freely slidable thereon.

The frame 50 assumes such an axial configuration that it is tunnelled but closed in section. To be specific, the frame 50 subsumes an upper wall 51E which uniformly extends from the upper end of the above-described wall 51C to that of the wall 51D in the longitudinal direction, and a bottom wall 51F which likewise extends from the lower end of the wall 51C to that of the wall 51D.

A couple of the movable pulleys 60A, 60B deviate in the axial direction of the cylinder 10 as well as in the longitudinal direction thereof. These movable pulleys 60A, 60B are equipped on the external surface of the cylinder 10. Namely, the movable pulley 60A is disposed on one side of the front end portion of the cylinder 10; and the movable pulley 60B is disposed on the other side of the rear end portion thereof, the pulleys 60A, 60B deviating from each other. In this embodiment, sprocket wheels are employed as the movable pulleys.

A couple of the fixed pulleys 80A, 80B are so provided as to deviate on both sides of the frame 50 in the longitudinal direction as well as in the widthwise direction; and some portions of the peripheries thereof are exposed from the upper wall 51E. Namely, one fixed pulley 80A corresponding to the movable pulley 60A is installed so that a part of the periphery thereof is exposed upwards from a notch 90A formed on one side of the rear end portion of the upper wall 51E of the frame 50. The other fixed pulley 80B is similarly installed so that a part of the periphery thereof is exposed upwards from a notch 90B formed on the other side of the front end portion of the upper wall 51E of the frame 50. In this embodiment, sprocket wheels are adopted as the fixed pulleys 80A, 80B.

In this embodiment, chains serve as the two flexible linkage members 70A, 70B. Of these two flexible linkage members 70A, 70B, one flexible linkage member 70A spans between one movable pulley 60A and one fixed pulley 80A; and this member 70A is then reversed in direction so that the moving end portion thereof, viz., the tip end portion, is connected to the moving board 40, and its proximal end portion is connected to the rear end standing wall 51B of the frame 50.

The other flexible linkage member 70B is spanned between the other movable pulley 60B and the other fixed pulley 80B; and the same member 70B is likewise reversed in direction so that the moving end portion thereof is linked to the moving board 40, and its proximal end portion is linked to the front end standing wall 51A of the frame 50.

The front and rear passages 21a, 21b which are formed in the piston rod 20 are constituted such that these passages 21a, 21b are selectively communicatable with respect to a fluid supplying source, viz., a compressed air supplying source and the atmosphere as well as by means of a piping system including well known fluid passage change-over valves (not illustrated).

Operations in regard to the aforecited constitution will next be described.

(1) In a state shown in FIG. 1 wherein the cylinder 10 is positioned at the stroke front end, the front passage 21a formed in the piston rod 20 is rendered open to the atmosphere; and the high pressure air is supplied via the rear passage 21b to the rear chamber 12 of the cylinder 10.

Figure 4:
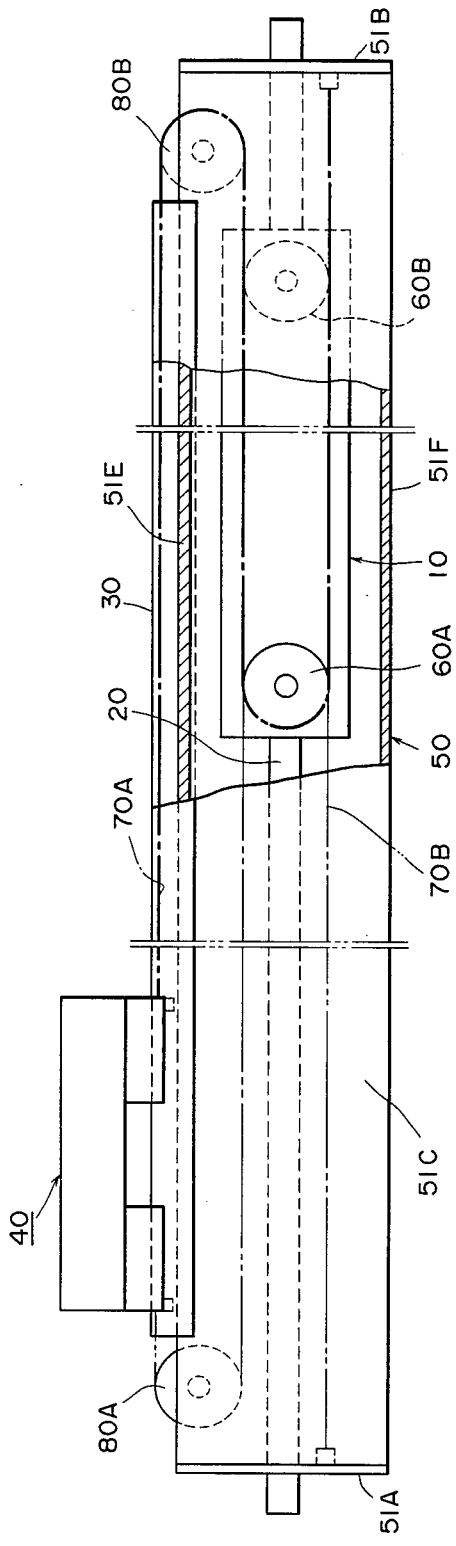
FIG. 4 is a diagramatic side view showing a cylinder and a moving board which are on the operation.
Figure 5:
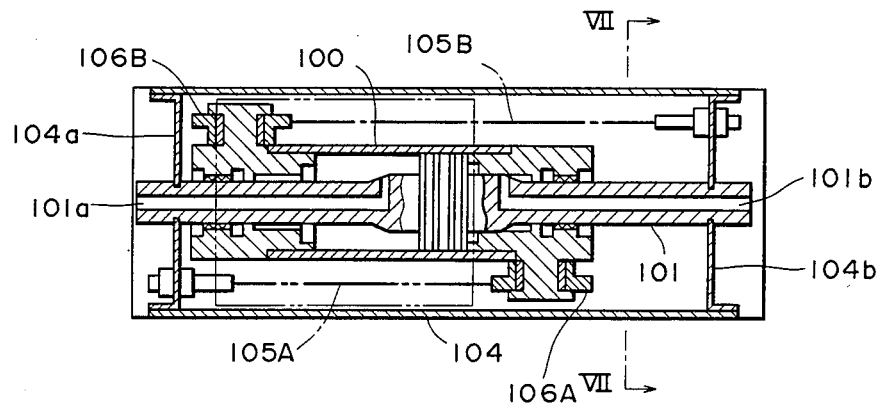
FIG. 5 is a diagramatic plan view showing a prior art example.
Figure 6:
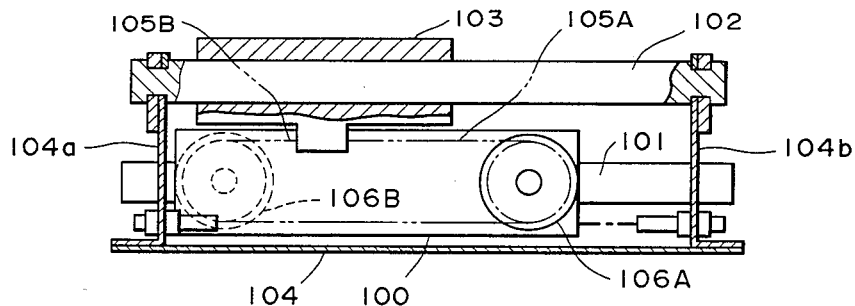
FIG. 6 is a side view of the prior art example shown in FIG. (5)
Figure 7:
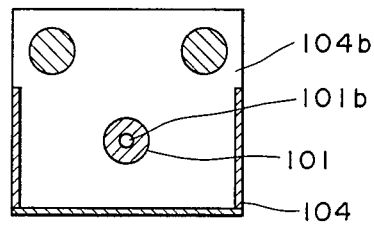
FIG. 7 is a sectional view taken substantially along the line VII—VII of FIG. 5.

(2) The front chamber 11 of the cylinder 10 is lowered in pressure, while at the same time the pressure of the rear chamber 12 thereof increases, at which time the cylinder 10 retreats to the rear end position shown in FIG. 4 with the guide of the piston rod 20.

(3) As shown in FIG. 1 the moving board 40 that is at the stroke rear end is hauled by the flexible linkage member 70B due to the operation described in (2); and the same board 40 advances at a stroke distance that is twice as far as the retreat stroke of the cylinder 10 with the guide of the two guide rails 30 up to the stroke front end position shown in FIG. 4.

(4) In a state shown in FIG. 4 wherein the cylinder 10 is positioned at the stroke rear end, the rear passage 21b of the piston rod 20 is opened to the atmosphere; and the high pressure air is supplied through the front passage 21a to the front chamber 11 of the cylinder 10.

(5) The rear chamber 12 of the cylinder 10 decreases in pressure, whereas the front chamber 11 thereof is pressurized, so that the cylinder 10 retreats with the guide of the piston rod 20 and returns to the stroke front end position shown in FIG. 1.

(6) As shown in FIG. 4, the moving board 40 that is at the stroke front end is hauled by the flexible linkage member 70A due to the operation described in (5); and the same board 40 retreats at a stroke twice as far as the advancing stroke length of the cylinder 10 and then returns to the stroke rear end position shown in FIG. 1.

As described above, the moving board 40 makes reciprocatory movement at a given stroke which is determined by the stroke of the cylinder 10 in accordance with the reciprocatory movement of the cylinder 10. Hence, a goods catch and take-off carrying means (not illustrated) like robot's hands which is mounted on the moving board 40 is reciprocatively moved at the same stroke as that of the moving board 40, for instance, from a goods carry-in position to a goods carry-out position where the goods are carried in and out.

In the present invention, the constitution is such that there are provided the fixed pulleys 80A, 80B whose peripheries are partially exposed from the upper wall 51E of the frame 50, and the flexible linkage members 70A, 70B respectively span the fixed pulleys 80A, 80B and are then reversed in direction, whereby other members such as robot hands do not interfere with the moving board 40 and the flexible linkage members 70A, 70B when the cylinder 10 and the moving board 40 are on the operation, even though the foregoing other members are interposed between the cylinder 10 and the moving board 40. Namely, the frame 50 itself assumes such a cross-sectional configuration that it is tunnelled but closed in section; and the frame subsumes the upper wall 51E which uniformly extends in the longitudinal direction from the upper end of the wall 51C to that of the wall 51D.

It is therefore possible to sharply increase the rigidity of the frame 50, especially the torsional rigidity in the case of the frame in which the moving board 40 is large in stroke.

Moreover, the notches 90A, 90B formed in the upper wall 51E are extremely small in opening area and hence it is feasible to considerably restrict the amount of the dust which infiltrates into the frame 50.

What is claimed is:

1. A slide cylinder device in which a moving board reciprocatively moves in accordance with the reciprocatory movement of a cylinder, said slide cylinder device comprising:
    a piston rod;
    a cylinder which is reciprocatively movable with said piston rod;
    at least two guide rails provided in parallel with said piston rod;
    a moving board which is reciprocatively movable along said guide rails;
    a frame including standing walls which are provided at both ends of said frame in a longitudinal direction, said standing walls supportingly fixing respective end portions of said piston rod and said guide rails, said frame having an axial configuration that is tunnelled but closed in section;
    a pair of movable pulleys provided longitudinally in said frame, said movable pulleys deviating in the axial direction of said cylinder;
    at least two flexible linkage members each having a free end portion linked to said moving board and having a proximal end portion linked to said frame, said flexible linkage members each being spanned to each of said movable pulleys; and
    a pair of fixed pulleys having some portion of their peripheries exposed from notches in said frame, said notches being formed to deviate on both sides of said frame in the longitudinal direction as well as on both sides of a widthwise direction of said frame, and each of said flexible linkage members, which are spanned to said movable pulleys, being reversed by means of said fixed pulley in order to be linked to said moving board, said moving board being disposed outside said frame.

2. A slide cylinder device as set forth in claim 1, wherein said flexible linkage members are chains.

3. A slide cylinder device as set forth in claim 1, wherein said movable pulleys and fixed pulleys are sprocket wheels.

* * * * *